O. A. LUNDGREN.
DRIVING GEAR FOR MOTOR VEHICLES.
APPLICATION FILED SEPT. 12, 1916.

1,265,690.

Patented May 7, 1918.
2 SHEETS—SHEET 1.

Witnesses
J H Crawford
R M Smith

Inventor
O. H. Lundgren,
By Victor J. Evans
Attorney

O. A. LUNDGREN.
DRIVING GEAR FOR MOTOR VEHICLES.
APPLICATION FILED SEPT. 12, 1916.

1,265,690.

Patented May 7, 1918.
2 SHEETS—SHEET 2.

Witnesses
J.H. Crawford
R.M. Smith

Inventor
O.A. Lundgren,
By Victor J. Evans
Attorney

UNITED STATES PATENT OFFICE.

OLOF A. LUNDGREN, OF CLEVELAND, OHIO, ASSIGNOR OF ONE-THIRD TO A. SCHNEIDER, OF CLEVELAND, OHIO.

DRIVING-GEAR FOR MOTOR-VEHICLES.

1,265,690. Specification of Letters Patent. Patented May 7, 1918.

Application filed September 12, 1916. Serial No. 119,709.

*To all whom it may concern:*

Be it known that I, OLOF A. LUNDGREN, a citizen of the United States, residing at Cleveland, in the county of Cuyahoga and State of Ohio, have invented new and useful Improvements in Driving-Gears for Motor-Vehicles, of which the following is a specification.

This invention relates to driving gear for motor vehicles, the object in view being to provide in connection with the driving wheels of a motor vehicle, means whereby they may be propelled or driven from a suitable motor in such manner as to impart increased power to the driving wheels as compared with the present day automobile and motor truck practice and whereby also the weight of the vehicle and its load is supported in advance of the center of each wheel, producing as a whole a machine of easy running qualities, reducing the running expenses of the vehicle and also greatly facilitating the steering operation in that the steering wheels tend to return toward a straight ahead position after being deflected laterally to either side for steering purposes.

With the above and other objects in view, the invention consists in the novel construction, combination and arrangement of parts, as herein described, illustrated and claimed.

In the accompanying drawings:—

Figure 1:
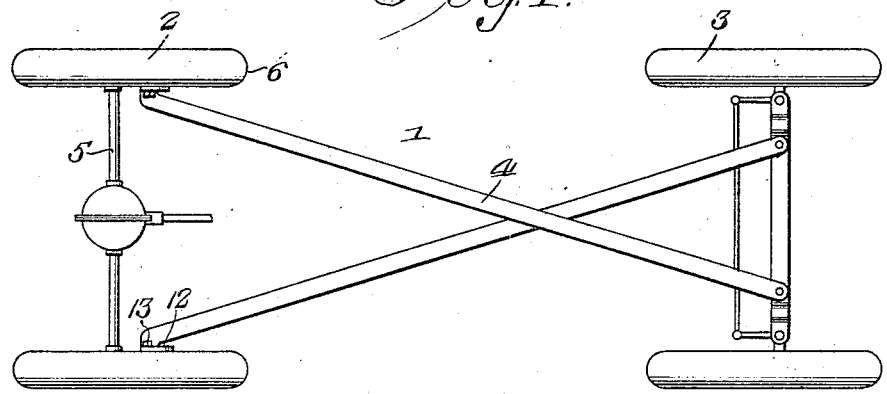
Figure 1 is a plan view of the chassis of a motor vehicle showing the invention in its applied relation thereto.
Figure 2:
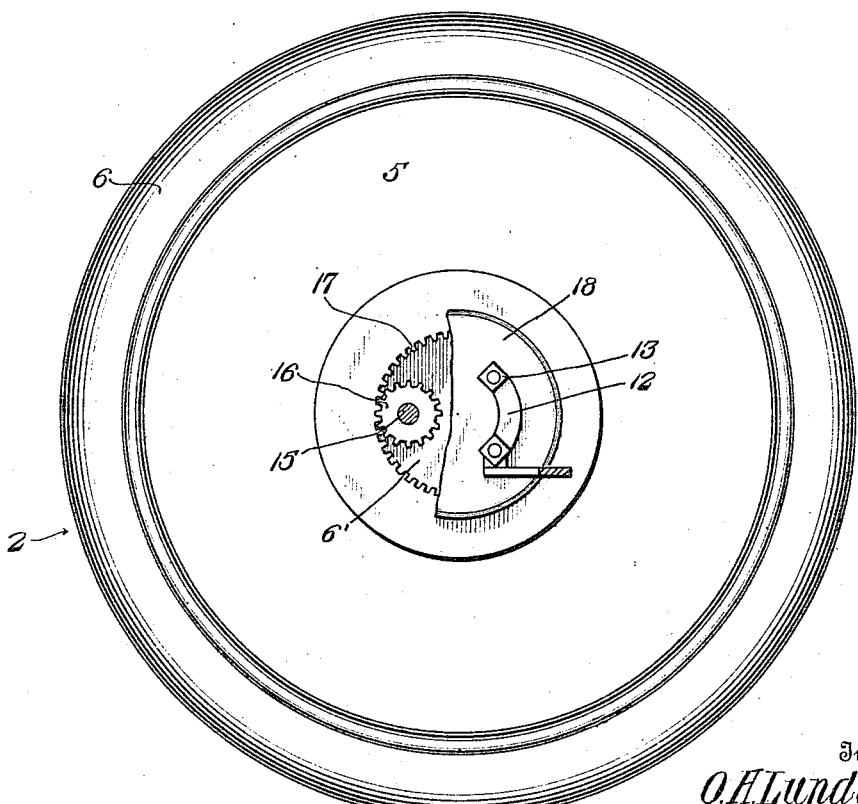
Fig. 2 is an inside face view of one of the driving wheels of the vehicle with the adjacent housing plate broken away.
Figure 3:
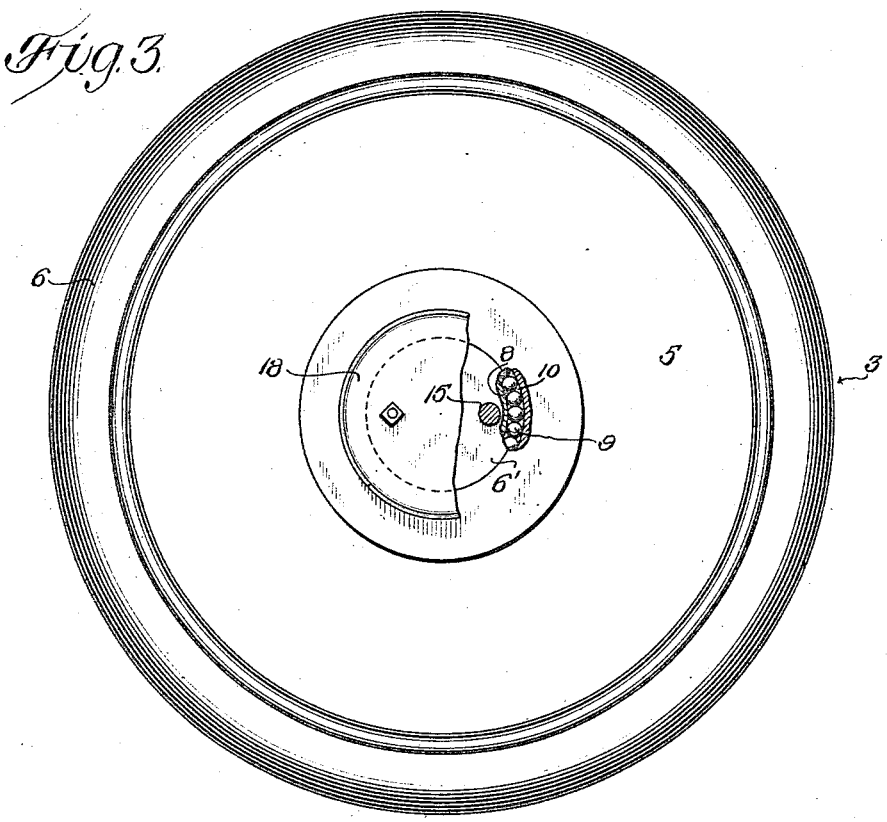
Fig. 3 is a similar view of one of the front wheels.
Figure 4:
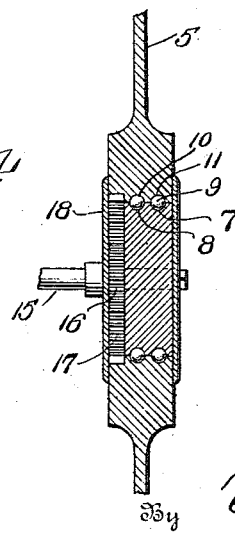
Fig. 4 is a vertical cross section through one of the wheels.

Referring to the drawings 1 designates the frame of a motor vehicle, 2 the driving wheels thereof, 3 the steering wheels and 4 the cross and tie braces hereinafter more particularly referred to. Each of the wheels 2 and 3 comprises an annular body 5 of sufficient width at its periphery to receive a tire 6 secured thereto in any desired manner. Each of the wheels is mounted to turn around a stationary bearing member 6' which is formed in the periphery thereof with race ways 7 and 8 for annular series of antifriction balls 9, the inner periphery of the body 5 of the wheel being formed with corresponding ball races 10 and 11, a double ball bearing being thus formed between the body of the wheel and the supporting and bearing member 6.

In the case of each of the driving wheels 2, the bearing member 6 is fastened to the frame of the machine and bears a fixed relation thereto while in the case of each of the front or steering wheels, the bearing member 6 is carried by one of the steering knuckles. Each of the braces 4 is provided at the rear end thereof with an arcuate extension 12 which is secured by fastening means 13 to the adjacent member 6 on one side of the machine, said brace being connected at its forward extremity to the steering knuckle of one of the front wheels at the opposite side of the machine.

The driving mechanism for the rear wheels comprises a shaft 15 constituting the rear driving axle of the machine, said shaft being usually of sectional construction and embodying the usual differential gearing and having fast on the opposite ends thereof driving pinions 16 the teeth of which mesh with an internal gear face 17 on the inner periphery of the body 5 of such wheel. The shaft or axle 15 may be driven from the engine (not shown) mounted on the frame in the usual manner, any suitable or usual driving connections being interposed between the engine and the driving shaft or axle 15. Housing plates 18 are secured to the opposite faces of each of the wheels and formed with suitable bearings and openings for the shaft 15 and the adjacent ends of the braces 4.

From the foregoing description, taken in connection with the accompanying drawings, it will now be understood that the weight of the vehicle is imposed upon the bearing members 6 which are stationary and which together with the housing plates 18 are formed with bearings for the driving shaft or axle 15. Such driving axle or shaft is of course only employed in connection with the driving wheels of the machine, the steering wheels being merely carried by the usual steering knuckles and no driving mechanism being used in connection therewith. As the pinions 16 are considerably smaller than the internal gear faces 17 of the driving wheels, an engine of comparatively small power may be utilized to drive the vehicle thus reducing the running expenses of the machine. Furthermore, the gearing is entirely inclosed or housed in by the plates 18 which serve to retain grease or other lubricant, any suitable means being employed for permitting the lubricant to be introduced so as to reach the teeth of the gears 16 and 17 and the ball bearings interposed between the body of the wheel and the supporting and bearing member 6.

I claim:

Driving gear for motor vehicles embodying in connection with a vehicle frame, circular bearing members for the wheels, wheels surrounding said bearing members and rotatable thereon, each of the driving wheels embodying an internal gear face, a driving axle extending through both of the driving wheels, pinions fast on said driving axle and meshing with the internal gear faces of the driving wheels, and braces each fastened at one end to the bearing member of one of the driving wheels and connected at its forward end to the front axle.

In testimony whereof I affix my signature.

OLOF A. LUNDGREN.

Copies of this patent may be obtained for five cents each, by addressing the "Commissioner of Patents, Washington, D. C."